US009778915B2

(12) United States Patent
Shukla et al.

(10) Patent No.: US 9,778,915 B2
(45) Date of Patent: Oct. 3, 2017

(54) DISTRIBUTED APPLICATION DEFINITION

(75) Inventors: Dharma Shukla, Sammamish, WA (US); Akash Jeevan Sagar, Redmond, WA (US); Nathan C. Talbert, Seattle, WA (US); Muthukaruppan Annamalai, Kirkland, WA (US); Robert B. Schmidt, Carlsbad, CA (US); Aditya Bhandarkar, Sammamish, WA (US); Asad Jawahar, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 691 days.

(21) Appl. No.: 13/037,299

(22) Filed: Feb. 28, 2011

(65) Prior Publication Data

US 2012/0222003 A1   Aug. 30, 2012

(51) Int. Cl.
*G06F 9/44*   (2006.01)

(52) U.S. Cl.
CPC ..................... *G06F 8/20* (2013.01)

(58) Field of Classification Search
CPC ........... G06F 17/2247; G06F 8/20; G06F 8/24
USPC ......................................................... 717/104
See application file for complete search history.

(56) References Cited

U.S. PATENT DOCUMENTS

| 5,784,612 | A | 7/1998 | Crane et al. |
| 5,948,072 | A | 9/1999 | Cink et al. |
| 6,473,794 | B1 | 10/2002 | Guheen et al. |
| 6,535,975 | B1 | 3/2003 | Thompson et al. |
| 6,546,553 | B1 * | 4/2003 | Hunt .............................. 717/174 |
| 6,856,995 | B1 | 2/2005 | Ibitayo et al. |
| 6,907,395 | B1 | 6/2005 | Hunt et al. |
| 7,080,143 | B2 | 7/2006 | Hunt et al. |
| 7,162,509 | B2 | 1/2007 | Brown et al. |
| 7,181,731 | B2 | 2/2007 | Pace et al. |
| 7,302,634 | B2 | 11/2007 | Lucovsky et al. |
| 7,350,213 | B2 | 3/2008 | Deutesfeld et al. |
| 7,356,613 | B2 | 4/2008 | Cuomo et al. |
| 7,418,484 | B2 | 8/2008 | Presley |
| 7,448,022 | B1 | 11/2008 | Ram et al. |
| 7,451,435 | B2 | 11/2008 | Hunt et al. |
| 7,516,442 | B2 | 4/2009 | Wu et al. |
| 7,571,206 | B2 | 8/2009 | Koning et al. |
| 7,603,444 | B2 | 10/2009 | Bullis |
| 7,730,068 | B2 | 6/2010 | Sarnowicz et al. |
| 7,779,383 | B2 | 8/2010 | Bornhoevd et al. |
| 7,783,763 | B2 | 8/2010 | Tuel |
| 7,788,233 | B1 | 8/2010 | Iyer et al. |
| 7,788,674 | B1 | 8/2010 | Siegenfeld |
| 7,814,551 | B2 | 10/2010 | Darweesh et al. |

(Continued)

OTHER PUBLICATIONS

IBM, "Service component model based runtime," IP.com, 2007, 5pg.*

(Continued)

*Primary Examiner* — Ryan Coyer
(74) *Attorney, Agent, or Firm* — Dicke, Billig & Czaja, PLLC

(57) ABSTRACT

A method of creating an application definition for a distributed application is disclosed. Constructs corresponding with a schema of the distributed application are defined in a declarative and technology agnostic manner. The constructs include the application definition, a module definition, and a component definition. Each construct includes metadata.

25 Claims, 3 Drawing Sheets

(56) References Cited

U.S. PATENT DOCUMENTS

| | | | |
|---|---|---|---|
| 7,937,714 | B2 | 5/2011 | Grigsby et al. |
| 8,060,865 | B2 | 11/2011 | Kimmerly |
| 8,116,888 | B2 | 2/2012 | Tsai |
| 8,136,109 | B1 | 3/2012 | Birdeau et al. |
| 9,465,589 | B2 | 10/2016 | Shukla et al. |
| 2002/0174268 | A1 | 11/2002 | Goward et al. |
| 2003/0051236 | A1 | 3/2003 | Pace et al. |
| 2003/0110044 | A1 | 6/2003 | Nix et al. |
| 2003/0131073 | A1 | 7/2003 | Lucovsky et al. |
| 2005/0021696 | A1 | 1/2005 | Hunt et al. |
| 2005/0076195 | A1 | 4/2005 | Fuller et al. |
| 2005/0144226 | A1 | 6/2005 | Purewal |
| 2005/0262499 | A1* | 11/2005 | Read .............................. 717/172 |
| 2005/0289524 | A1 | 12/2005 | McGinnes |
| 2006/0111880 | A1 | 5/2006 | Brown et al. |
| 2006/0271341 | A1* | 11/2006 | Brown et al. ...................... 703/1 |
| 2007/0061779 | A1 | 3/2007 | Dowedeit et al. |
| 2007/0067366 | A1 | 3/2007 | Landis |
| 2007/0073829 | A1 | 3/2007 | Volodarsky et al. |
| 2007/0156872 | A1 | 7/2007 | Stoyanova |
| 2007/0162904 | A1 | 7/2007 | Kimmerly |
| 2007/0165544 | A1 | 7/2007 | Zhang |
| 2007/0203944 | A1 | 8/2007 | Batra et al. |
| 2007/0226203 | A1 | 9/2007 | Adya et al. |
| 2007/0233969 | A1* | 10/2007 | Shukla et al. ................. 711/150 |
| 2007/0294312 | A1 | 12/2007 | Seshadri et al. |
| 2008/0114829 | A1 | 5/2008 | Button et al. |
| 2008/0195726 | A1 | 8/2008 | Melby et al. |
| 2008/0256514 | A1 | 10/2008 | Shiflet |
| 2008/0262828 | A1 | 10/2008 | Och et al. |
| 2009/0007093 | A1 | 1/2009 | Lin |
| 2009/0113451 | A1 | 4/2009 | Grigsby et al. |
| 2009/0199213 | A1 | 8/2009 | Webster et al. |
| 2009/0248693 | A1 | 10/2009 | Sagar et al. |
| 2009/0249310 | A1 | 10/2009 | Meijer et al. |
| 2010/0057787 | A1 | 3/2010 | Gnech et al. |
| 2010/0153955 | A1 | 6/2010 | Sirota et al. |
| 2010/0241252 | A1 | 9/2010 | Tsai |
| 2010/0318975 | A1 | 12/2010 | Gustafsson et al. |
| 2012/0159424 | A1 | 6/2012 | Shukla et al. |
| 2012/0159425 | A1 | 6/2012 | Shukla et al. |
| 2012/0246613 | A1 | 9/2012 | Shukla et al. |
| 2012/0254109 | A1 | 10/2012 | Shukla et al. |
| 2012/0260227 | A1 | 10/2012 | Shukla et al. |

OTHER PUBLICATIONS

Bellissard, et al., "Distributed Application Configuration", Retrieved at << http://sardes.inrialpes.fr/~boyer/research/publications-web/96-Olan-ICDCS.pdf >>, Proceedings of the 16th International Conference on Distributed Computing Systems, 1996, pp. 7.

Rasche, et al., "ReDAC—Dynamic Reconfiguration of distributed component-based applications", Retrieved at << http://www.dcl.hpi.uni-potsdam.de/papers/papers/rasche__isorc08.pdf >>, Proceedings of the 11th IEEE Symposium on Object Oriented Real-Time Distributed Computing, 2008, p. 1-9.

Thalauer, Stefan, "Aspects of Interrelations in Distributed Component Systems", Retrieved at << http://www.iicm.tu-graz.ac.at/thesis/sthalauer.pdf >>, May 2004, pp. 85.

Soley, Richard, "Model-driven architecture targets middleware interoperability challenges", Retrieved at << http://www.ibm.com/developerworks/rational/library/403.html >>, Jul. 15, 2003, pp. 7.

Urquhart, James, "Application packaging for cloud computing: A proposal," Retrieved at<<http://news.cnet.com/8301-19413_3-10422517-240.html>>, Jan. 2, 2010, p. 4.

Peltzer, Dwight, "IBM's WebSphere Application Server vs. Microsoft's .Net Framework," Retrieved at<<http://websphere.sys-con.com/node/45007 >>, May 26, 2004, p. 4.

Pattison, Ted, "Visual Basic .Net: New Programming Model and Language Enhancements Boost Development Power," Retrieved at<<http://msdn.microsoft.com/en-us/magazine/cc302016.aspx>>, Feb. 2001, p. 9.

The Office Action for U.S. Appl. No. 12/975,127 dated Jul. 16, 2013 (16 pgs.).

Galán, F., et al., Service Specification in Cloud Environments based on Extensions to Open Standards, Proceedings of the Fourth International ICST Conference on Communication System Software and Middleware, Jun. 16-19, 2009, 12 pages. [retrieved on Jul. 3, 2013], Retrieved from the Internet:<URL:http://dl.acm.org/>.

The Final Office Action for U.S. Appl. No. 12/975,127 dated Oct. 9, 2013 (16 pgs).

The Office Action for U.S. Appl. No. 12/975,127 dated Jul. 30, 2014 (14 pgs).

The Final Office Action for U.S. Appl. No. 12/975,127 dated Dec. 31, 2014 (14 pgs).

The Office Action for U.S. Appl. No. 12/975,127 dated May. 13, 2015 (16 pgs).

Thota, Chandu, "Use Web Services Provisioning to Control Access, Usage, and Billing on Your Site", Retrieved at<<http://msdn.microsoft.com/en-us/magazine/cc188902.aspx>>, Dec. 2002, p. 14.

"Distributed Component Models", Retrieved at<<http://java.sun.com/developer/Books/jdbc/ch08.pdf>>, Retrieved Date: Nov. 25, 2010, pp. 146-182.

The Office Action for U.S. Appl. No. 13/071,982 dated Apr. 15, 2013 (21 pgs.).

The Final Office Action for U.S. Appl. No. 13/071,982 dated Sep. 27, 2013 (23 pgs.).

The Office Action for U.S. Appl. No. 131071,982 dated Feb. 13, 2014 (22 pgs.).

The Final Office Action for U.S. Appl. No. 13/071,982 dated Jun. 13, 2014 (24 pgs.).

The Office Action for U.S. Appl. No. 131071,982 dated May 8, 2015 (23 pgs.).

Volodarsky, Michael. "Fast, Scalable, and Secure Session State Management for Your Web Applications", Retrieved at<<http://msdn.microsoft.com/en-us/magazine/cc163730.aspx?wa=wsignin1.0>>, Sep., 2005, p. 12.

"Physical Tiers and Deployment", Retrieved at<<http://msdn.microsoft.com/en-us/library/ee658120.aspx>>, Retrieved Date; Nov. 24, 2010, p. 17.

Brown, Simon, "Scalability Principles", Retrieved at<<http://www.infog.com/articles/scalability-principles>>, May 21, 2008, p. 4.

"What is new in VMWare's vFabric GemFire 6.5?", Retrieved at<<http://jagslog.blogspot.com/2010/10/what-is-new-in-vmware-vfabric-gemfire.html>>, Oct. 7, 2010, p. 9.

A copy of the Office Action for U.S. Appl. No. 13/080,369 dated Jun. 10, 2013 (16 pgs.).

Microsoft Application Architecture Guide, 2nd Edition, published on Oct. 2009 (158 pgs).

Skonnard, "Building Distributed Applications with .NET Services," MSDN Magazine, Apr. 2009. 11 pgs.

Milner, Updated to release: Apr. 2010 A Developer's Introduction to Windows Workflow Foundation (WF) in .NET 4, Pluralsight Nov. 2009. 56 pgs.

The Final Office Action for U.S. Appl. No. 13/080,369 dated Dec. 17, 2013 (14 pgs.).

The Office Action for U.S. Appl. No. 13/080,369 dated Mar. 26, 2014 (15 pgs.).

The Final Office Action for U.S. Appl. No. 13/080,369 dated Jul. 8, 2014 (17 pgs.).

The Office Action for U.S. Appl. No. 13/080,369 dated Nov. 6, 2014 (15 pgs.).

Hong, et al., "Software Component Composition based on ADL and Middleware", Retrieved at<<http://pages.cs.wisc.edu/~chang/papers/SciChinaO1_ABC.pdf>>, vol. 44 No. 2, Apr. 2001, p. 16.

Lagaisse, et al., "True and Transparent Distributed Composition of Aspect-Components", Retrieved at<<http://people.cs.kuleuven.be/~bert.lagaisse/papers/lagaisse.middleware06.pdf>>, 2006, p. 20.

Sahai, et al., "A Data Model Based on Service and Process Abstractions for Management of Systems", Retrieved at<<http://www.hpl.hp.com/techreports/2002/HPL-2002-190.pdf>>, Jul. 9, 2002, p. 17.

Yau, et al., "Component Customization for Object-Oriented Distributed Real-Time Software Development", Retrieved at<<http://www.computer.org/portal/web/csdl/doi/10.1109/ISORC.2000.839523, Mar. 2000, p. 8.

(56) References Cited

OTHER PUBLICATIONS

The Office Action for U.S. Appl. No. 13/073,398 dated Mar. 27, 2013 (29 pgs.).
The Final Office Action for U.S. Appl. No. 13/073,398 dated Jul. 18, 2013 (31 pgs.).
The Office Action for U.S. Appl. No. 13/073,398 dated Jun. 17, 2014 (30 pgs.).
The Final Office Action for U.S. Appl. No. 13/073,398 dated Nov. 13, 2014 (32 pgs.).
The Office Action for U.S. Appl. No. 13/073,398 dated Mar. 26, 2015 (32 pgs.).
The Notice of Allowance for U.S. Appl. No. 13/080,369 dated Jun. 4, 2015 (18 pgs.).
Yau, et al., "A Component-Based Approach to Object-Oriented Distributed Application Software Development", Retrieved at<<http://ieeexplore.ieee.org/stamp/stamp.jsp?arnumber=00716662>>p. 6 (Aug. 19-21 1998).
The Final Office Action for U.S. Appl. No. 12/975,127 dated Sep. 16, 2015 (34 pgs.).
The Final Office Action for U.S. Appl. No. 13/073,398 dated Jul. 30, 2015 (44 pgs.).
The Office Action for U.S. Appl. No. 13/071,982 dated May 20, 2016 (32 pgs.).
The Notice of Allowance for U.S. Appl. No. 13/080,369 dated Jun. 7, 2016 (11 pgs.).
From Wikipedia, the Free Encyclopedia (redirected from Platform as a Service), "Cloud Computing," pp. 1-7 Retrieved Dec. 16, 2015) <<https://web.archive.org/web/20100228202033/http://en.wikipedia.org/wiki/ Platform_as_a_service#Plafform>>.
The Final Office Action for U.S. Appl. No. 13/071,982 dated Nov. 4, 2015 (42 pgs.).
The Notice of Allowance for U.S. Appl. No. 13/080,369 dated Oct. 27, 2015 (5 pgs.).
The Office Action for U.S. Appl. No. 13/073,398 dated Nov. 19, 2015 (35 pgs.).
The Notice of Allowance for U.S. Appl. No. 13/080,369 dated Feb. 12, 2016 (11 pgs.).
The Office Action for U.S. Appl. No. 12/975,127 dated Apr. 22, 2016 (18 pgs.).
The Final Office Action for U.S. Appl. No. 13/073,398 dated Mar. 15, 2016 (41 pgs.).
The Final Office Action for U.S. Appl. No. 12/975,127 dated Sep. 16, 2016 (25 pgs.).
The Office Action for U.S. Appl. No. 13/073,398 dated Aug. 24, 2016 (41 pgs.).
The Notice of Allowance for U.S. Appl. No. 13/071,982 dated Nov. 4, 2016 (13 pgs.).
The Notice of Allowance for U.S. Appl. No. 13/071,982 dated Feb. 27, 2017 (9 pgs.).
The Final Office Action for U.S. Appl. No. 13/073,398 dated Feb. 15, 2017 (42 pgs).
Cohen, U., et al., "Configuring the Processing Unit SLA", GigaSpaces [online], 2010 [retrieved Feb. 12, 2017], Retrieved from Internet:<URL:http://wiki.gigaspac.es.com/wiki/pagesiviewpage.action?pageld=61871680>, pp. 1-10.
The Notice of Allowance for U.S. Appl. No. 13/071,982 dated Apr. 19, 2017 (9 pgs.).

\* cited by examiner

DISTRIBUTED APPLICATION DEFINITION

BACKGROUND

Distributed computing applications are often deployed into environments having a multitude of different technologies and services that are used to form building blocks of the applications. Examples of distributed applications can include enterprise applications such as line of business or LOB, billing systems, customer relationship management or CRM, enterprise resource planning or ERP, business intelligence, human resource management, manufacturing, inventory control applications, and others. Such applications include components that are typically distributed across tiers in a computer network. Also, some applications are intended to run in a cloud computing environment, others are intended to run on the premises of the entity or user, and others are intended to span these environments. Further, the environment may change as an application evolves, the number of users change, or the locations of the users become dispersed.

One desirable characteristic of a distributed application is its ability to scale, or to cost-effectively change with the enterprise. Existing application models do not aim to support the development of scalable distributed applications. Typical component models are designed for desktop applications and are tier and technology specific. A distributed application typically comprises of a set of distinct components, spread across tiers, which interact to perform work. While the components are virtualized, the relationship between the components is not. A physical wiring of components during runtime interaction is typically statically determined or otherwise hard-coded in this framework, which can place limits on the ways in which the application can be scaled or even on the application's overall ability to scale. While working with such models, many developers try to avoid writing stateful components because they are difficult to scale, but in making this choice the developer sacrifices benefits of other approaches, such as the natural expression of application logic.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

The present disclosure is directed to an application definition of a distributed application constructed according to an application model or schema in an application framework. The distributed application schema includes one or more modules each including one or more components. A method of creating an application definition includes defining constructs corresponding with the schema in a declarative and technology agnostic manner. The constructs include the application definition, a module definition, and a component definition. Other constructs are possible, such as component export definition for each of the components providing an export, a component import definition for each of the components using an import, and a component aspect definition for each aspect. Each construct includes metadata.

The application definition provides the ability to schematize and extend the compositional structure and metadata in a format/representation agonistic manner. It can be use to validate the compositional structure of the distributed application as well as enforce the composition structure at runtime. Such a representation of compositional structure of an application having complex interactions among a set of distributed components provides the ability to reason over the application lifecycle and can be used to scale the distributed application in a distributed environment such as a cloud environment.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims. It is to be understood that features of the various exemplary embodiments described herein may be combined with each other, unless specifically noted otherwise.

Figure 1:
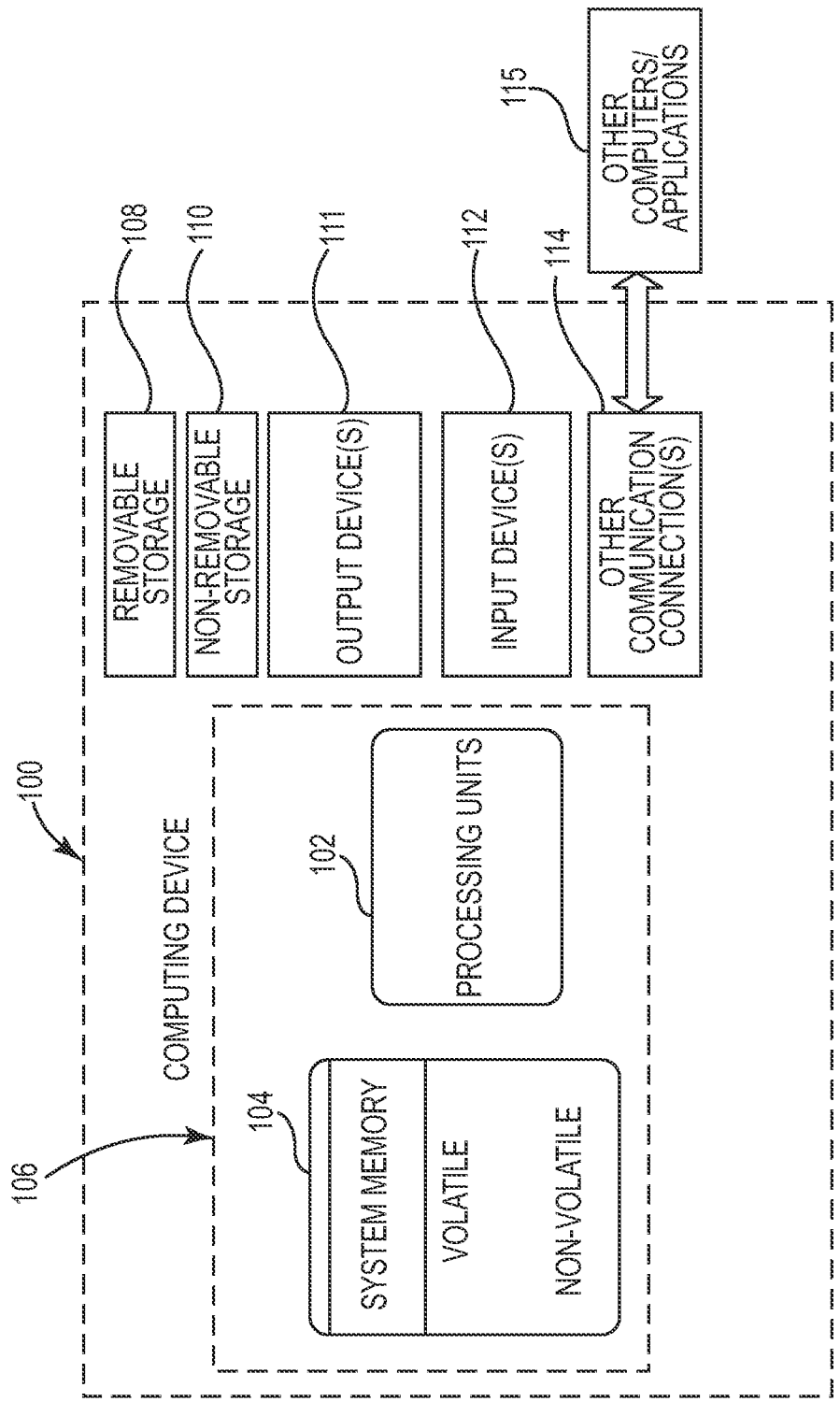
FIG. 1 is a block diagram illustrating an example computing device for running, hosting, or developing a distributed application.

FIG. 1 illustrates an exemplary computer system that can be employed in an operating environment such as a distributed computing system or other form of computer network and used to host or run a distributed application included on one or more computer readable storage mediums storing computer executable instructions for controlling a computing device or distributed computing system to perform a method. The computer system can also be used to develop the distributed application and/or provide a serialized description or visualized rendering of the application.

The exemplary computer system includes a computing device, such as computing device 100. In a basic configuration, computing device 100 typically includes a processor system having one or more processing units, i.e., processors 102, and memory 104. Depending on the configuration and type of computing device, memory 104 may be volatile (such as random access memory (RAM)), non-volatile (such as read only memory (ROM), flash memory, etc.), or some combination of the two. This basic configuration is illustrated in FIG. 1 by dashed line 106. The computing device can take one or more of several forms. Such forms include a person computer, a server, a handheld device, a consumer electronic device (such as a video game console), or other.

Computing device 100 can also have additional features or functionality. For example, computing device 100 may also include additional storage (removable and/or non-removable) including, but not limited to, magnetic or optical disks or solid state memory, or flash storage devices such as removable storage 108 and non-removable storage 110. Computer storage media includes volatile and nonvolatile, removable and non-removable media implemented in any suitable method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, universal serial bus (USB) flash drive, flash memory card, or other flash storage devices, or any other medium that can be used to store the desired information and that can be accessed by computing device 100. Any such computer storage media may be part of computing device 100.

Computing device 100 includes one or more communication connections 114 that allow computing device 100 to communicate with other computers/applications 115. An example communication connection can be an Ethernet interface. In some examples, the computing device can also have one or more additional processors or specialized processors (not shown) to perform processing functions offloaded from the processor 102. Computing device 100 may also include input device(s) 112, such as keyboard, pointing device (e.g., mouse), pen, voice input device, touch input device, etc. Computing device 100 may also include output device(s) 111, such as a display, speakers, printer, or the like.

The computing device 100 can be configured to run an operating system software program and one or more software applications, which make up a system platform. In one example, the computing device 100 includes a software component referred to as a managed, or runtime, environment. The managed environment can be included as part of the operating system or can be included later as a software download. Typically, the managed environment includes pre-coded solutions to common programming problems to aid software developers to create applications, such as software programs, to run in the managed environment.

Figure 2:
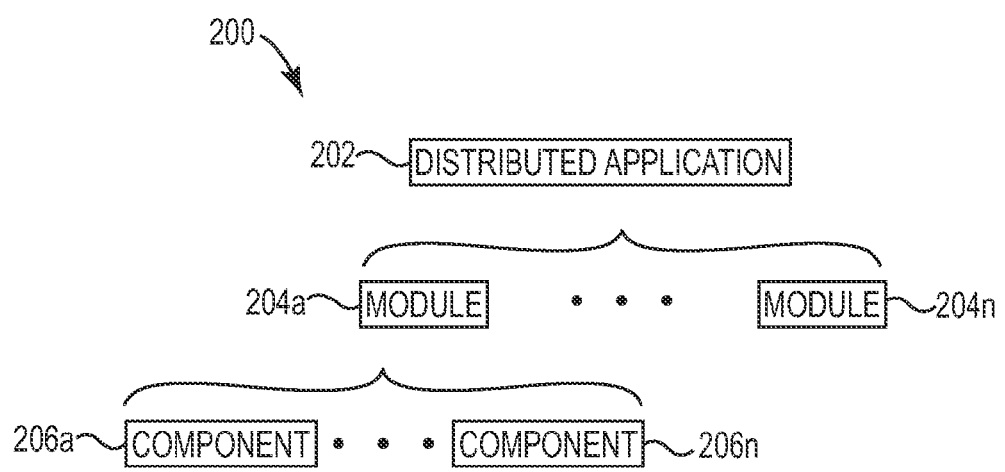
FIG. 2 is a block diagram illustrating a schema of an example distributed application.

FIG. 2 illustrates a schema 200 for a distributed application 202. The schema 200 generally describes the distributed application 202 constructed according to an application model in an application framework. The distributed application 202 includes one or more modules 204a-204n, and each module 204a-204n includes one or more components 206a-206n. Each component 206a-206n can specify imports and exports. Application 202 is hosted in an application fabric that, in one example, provides the capabilities to deploy, run, and manage distributed applications that are long running, stateful, and allow high availability and elastic scale. At runtime, the application framework provides the connections between the components 206a-206n of the application 202, described logically in the application model.

The distributed application 202 has an identity and is a unit of deployment and management in the application fabric. When deployed, the application 202 spans tiers in the environment. The tiers can include a client tier in many forms; a web tier, which is typically stateless, that can be available all of the time; a worker tier, including stateless and stateful components, that provides much of the logic of the application 202; and a storage tier that can be located on premises, in the cloud environment, or in a combination of the two. In one example, the application 202 is deployed to application fabric host farms. Physically, the application includes a package containing an application manifest that describes the compositional structure of the application, implementation details, configuration, and application artifacts.

A module, such as module 204a, is a tier-specific unit of hosting for a logical grouping of components 206a-206n that share execution characteristics. In one example, module 204a is a logical grouping of related components 206a-206n for the purposes of co-location and partitioning. Components 206a-206n in module 204a are deployed to the same host or single process. Each module 206a-206n can have an associate role such as a worker in a worker module or web in a web module.

A component, such as component 206a, is a unit of technology encapsulation, extensibility, composition, and reuse. (Components 206a-206n are distinguishable from a common language runtime object/type or with components in other technologies like component object model or distributed component object model, i.e., "COM/DCOM.") The component 206a encapsulates a certain technology. Such technologies can include, for example, a web application technologies or application programming interfaces for building connected, service-oriented applications. More than one component type can be developed for a given technology. For example, the application 202 could include a web application component and a service component in the web tier, a code component, a cache component, and a workflow component in the worker tier, and various storage components (such as tables or queues) and an SQL database component in the storage tier. In one example, the component 206a is a wrapper around a set of functionality. This wrapper hides the implementation details of the component yet exposes the functionality and dependencies that can allow loose coupling between service provider and consumers. The components 206a-206n can include artifacts and define the metadata at runtime.

Components 206a-206n can export, i.e., offer, a set of capabilities and can import, i.e., use, a set of capabilities. A component can import a capability or a service for consumption from another component 206n in the application 202 or from an external service. Also, the component can export a capability or a service that can be consumed by other components. Thus, component imports and component exports are the mechanisms by which the components 206a-206n are stitched together to form the application 202. Stitching may be described at the design stage or can be dynamic in that available exports can be discovered, imported, and used at runtime. In either case, the stitching is a logical expression of a component relationship; the procurement of proxies and the resolution of physical addresses to get two component instances communicating are brokered at runtime.

The distributed application framework provides developers and enterprises the ability to cost-effectively build, run, and evolve the distributed application 202. Both stateful and stateless components can be developed using familiar technologies, emerging technologies, and custom paradigms for specific domains. The components 206a-206n can be stitched together either statically or dynamically to form the application 202. Cloning, replication, and partitioning are supported within the application 202, as is the ability to make architectural tradeoffs such as among consistency, availability, and tolerance of "partitions" (such as describe in Brewster's CAP Conjecture).

In one example of an application model, the scalable application 202 can include the techniques of cloning, replication, and partitioning. Different techniques may apply to different parts of the application 202, which may change over time as the application grows. For example, cloning is a relatively straightforward technique, but in certain technologies it is exclusively suited for stateless components. Replication is an effective technique for stateful components, but it can be complex and limited. For example, the amount of state can grow during the life of the application 202 such as in the form of user sessions or cached data that are replicated across machines, or a row-locking scheme in a shared store that becomes the bottleneck to the performance of the application 202. In order to address the issue of growing state, a developer may choose to partition one or more components, which previously involved a costly and difficult re-architecture of the application 202.

In order to avoid a costly re-architecture, the application 202 is initially designed in a distributed application framework to support partitioning, which can be used regardless of whether application growth is anticipated. Design patterns and use of a distributed composition runtime can make intra-component wiring immune to otherwise invasive changes such as sharding, which is typically know as horizontal partitioning of a database, and component partitioning. Partitioning is made available in the application 202 and then is activated as desired. The application 202 can be readily designed to map the partitions to machines as well. Additionally, the developer can retain flexibility about whether a component 206a or the entire application 202 runs on premise or in a cloud computing environment. As the costs of infrastructure change over time, the architecture of the application 202 can naturally evolve to take advantage of the relative cost changes.

Components grouped together within a module can run within the same application domain. For example, two or more components 206a-206n can be co-located if they abide by the same partitioning scheme. In a partitioned module, each part is independent of the others and hence receives its own application domain within which the set of co-partitioned components for the corresponding part will run. The components 206a-206n within a module, such as module 204a, can communicate via direct method invocations. Across modules 204a-204n, components communicate by sending messages. A module type can correspond to the capability of the host. For example, a stateless component, such as a web role, can be hosted in a stateless module. Execution environments for modules include web and worker roles for stateless components and a fabric role for stateful components.

During runtime, the distributed application framework can monitor the application 202 to diagnose and repair issues as well as meter the use of the components 206a-206n. The distributed application framework can elastically allocate and reclaim resources to support a fluctuating demand. Further, the distributed application framework provides for the ability to later partition the application 202, co-locate partitioned components 206a-206n, change a mapping of partitions to a physical infrastructure, as well a shard a database without costly re-architecture.

In one example, an application fabric available under the trade designation of AppFabric can run on premise, such as a server operating system available under the trade designation of Windows Server, and in a cloud environment having a cloud computing or cloud services operating system available under the trade designation Windows Azure, all available from Microsoft, Inc., allowing entire applications (or components within them) to be deployed to either environment or a combination the two. Web roles, workflow, and the like can be built using Windows Communication Foundation (WCF) and Windows Work Flow (WF) available from Microsoft, Inc.

The application framework provides a mechanism for declaratively describing and constructing the distributed application 202 in an application definition. The application definition describes a form of a type system that captures the components 206a-206n within the application 202, the producer-consumer relationships between the components 206a-206n, and any external components or services consumed by components 206a-206n in the application 202. The application definition describes the configuration and constraints of the components as well as component dependencies, interrelationships, and interactions of the distributed application in a declarative manner. The application definition also provides the ability to schematize and extend the compositional structure and metadata in a format/representation agonistic manner. It can be use to validate the compositional structure of the distributed application as well as enforce the composition structure at runtime. Such a representation of compositional structure of an application having complex interactions among a set of distributed components provides the ability to reason over the application lifecycle and can be used to scale the distributed application in a distributed environment such as a cloud environment.

Figure 3:
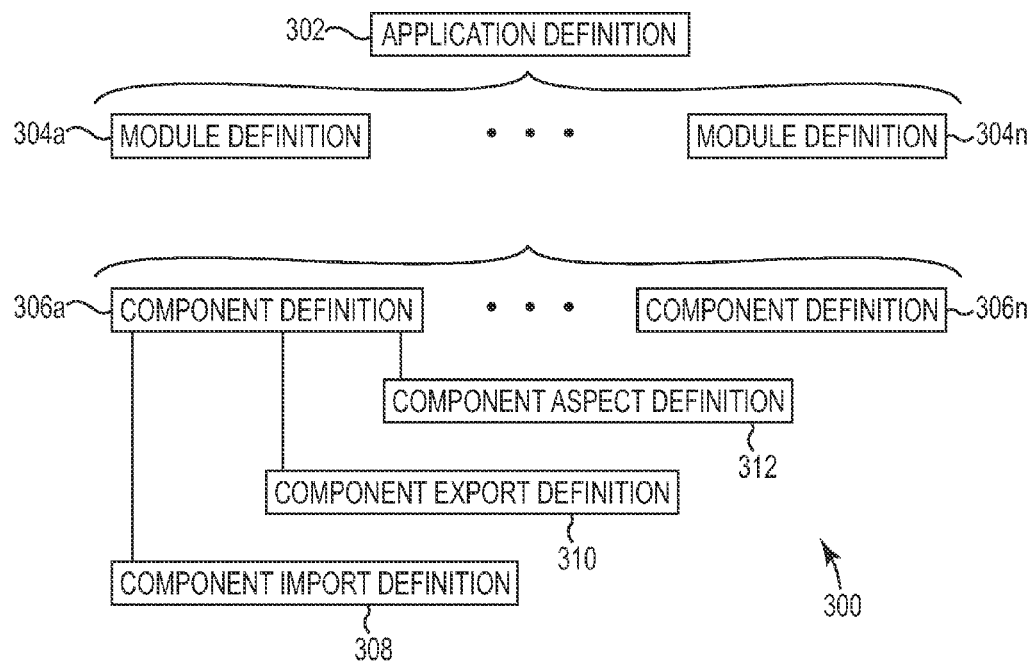
FIG. 3 is a block diagram illustrating an application definition of the distributed application of FIG. 2.

FIG. 3 illustrates a definition tree 300 including definition constructs of an application definition 302, one or more module definitions 304a-304n, and one or more component definitions 306a-306n for each module definition. The root of the definition tree 300 is the application definition 302. The application definition 302 includes one or more module definitions 304a-304n, each corresponding with the one or more modules 204a-204n. Each module definition includes one or more component definitions 306a-306n, which correspond to the components 206a-206n. Additional constructs are included depending on the particular features of the components 206a-206n. Each component offering an export includes a component export definition 308. Each component using an import includes a component import definition 310. Each component providing an aspect, such as a cross-cutting concern, includes a component aspect definition 312. Each definition construct includes associated metadata that further describes the construct, and examples are provided below.

The component definition 306a is a declarative description of its corresponding component 206a. For example, a component definition is a generic concept that can be used to define any component by supplying appropriate metadata. Component definitions 306a-306n can share a common set of metadata that describe the fundamental aspects of each component.

In one example, the common set of metadata shared in each component definition can include metadata regarding a "Component Name," "Qualified Name," "Version," "Activation Policy," "Module Affinity," "Component Type," and "Artifacts." The "Name" distinguishingly identifies the component definition within the scope of its container. The name of the component is qualified by the names of its schema chain in a "Qualified Name," which is distinguishable within the entire application definition. An example is [Application Definition Name].[Module Definition Name]. [Component Definition Name]. Component definitions 306a-306n can go through changes and updates as the application evolves, and "Version" specifies the version of the component definition as used in the current definition. "Activation Policy" describes the policy for activating the component at runtime. For example, an auto-start policy would start the component 206a as soon as the application 202 starts execution and an on-demand policy will delay start the component 206a upon request. "Module Affinity" specifies the type to modules that are used as the container for the component 206a. For example, a web component can be assigned to a web module. "Component Type" serves to specify the runtime type of the component, which can be a common language runtime type. "Artifacts" includes a list of component artifacts for the component. A component artifact is a component specific artifact that can be requisite for proper execution of the component 206a, such as a configuration file or a binary. The component definition 306a can also include a collection of component export definitions and component import definitions. In addition to the common set of metadata, each component definition 306a-306n can specify component-specific metadata. This component-specific metadata is opaque to the application model and is understood by the component 206a and other components that consume it.

The component export definition 310 is an abstract construct that can be used to describe an export. The functionality offered by the export is specified as a contract. Component export definition 310 includes metadata regarding "Name," "Qualified Name," "Exporting Component Name," "Proxy Artifacts," "Proxy Type Hint," "Aspects," "Contract," "Visibility," "Listen Address," "Claimed Listen Address Hint," "Canonical Address," and "Publish Address." The "Name" distinguishably identifies the export definition within the scope of its container. The "Qualified Name" is the name of the export definition qualified by the names of its schema chain. The "Qualified Name" of the export definition is distinguishable within the application definition. An example is [Application Definition Name]. [Module Definition Name].[Component Definition Name]. [Export Definition Name]. The "Exporting Component Name" is the name of the component 206a that proffers the export definition. The "Proxy Artifacts" is a list of component artifacts that are used to produce proxies to the export at runtime. The "Proxy Type Hint" is a common language runtime type of the proxy that will consume the export at runtime as represented by the export definition. "Aspects" includes a list of aspect definitions that are applied to the export at runtime, and are described below. The "Contract" represents the functionality offered by the export, and the "Contract" semantics are specific to the export definition and opaque to the application model. "Visibility" defines the scope at which the export definition is visible. Examples of visible include application wide, visible externally, visible within module, and the like. The "Component Export Type" specifies the runtime type (a common language runtime type) of the export associated with the export definition. The "Listen Address Hint" includes the intent of the component to reserve an address that the component can listen on at runtime. The listen address hint is configured as to what scheme should be used, desired port, and the like. The "Claimed Listen Address" is the physical address assigned to the export at runtime. The "Canonical Address" is the logical address of the export and is a stable address that can be cached. The export can be uniquely addressed using the logical address. The "Publish Address" is the address of the export intended to be publicly shared. The address would normally be pretty printed. In addition to the above, a component export definition may specify additional metadata that is specific to the component, defined by the component export and opaque to the application model.

The component import definition 308 is a generic construct that can be used to describe any import. The component import definition can include metadata regarding "Name," "Qualified Name," "Owner Component," "Instancing Policy," "Cardinality," and "Constraint." The "Name" identifies the import definition within the scope of its container. The "Qualified Name" is the name that distinguishingly identifies the component definition within its ancestor chain in a "Qualified Name," which is distinguishable within the entire application definition. An example is [Application Definition Name].[Module Definition Name]. [Component Definition Name].[Import Definition Name]. The "Owner Component" is the definition of the component that contains the import definition. The "Instancing Policy" specifies the lifetime of the proxy that is obtained to satisfy the import such as singleton, per call, or the like. The "Cardinality" specifies the number of exports acceptable to the component: none, one, or more than one. The "Constraint" is a predicate that takes the export definition and can be used to find matching export definitions for the present import definition.

The module definition 304a is a declarative description of a corresponding module 204a. Module definition 304a is a generic concept and can be used to define the module 204a by supplying appropriate metadata. Module definitions 304a-304n can share a common set of metadata that describe the fundamental aspects of module 204a-204n. In one example, the common set of metadata shared in each module definition 304a-304n can include metadata regarding "Name," "Qualified Name," "Isolation Level," "Machine Size," "Enable High Availability," "Instance Count Hint," "Component Definitions," and "Aspect Definitions." The "Name" identifies the module definition within the scope of its container. The "Qualified Name" is the name of the module qualified by the names of its ancestor chain, for example [Application Definition Name].[Module Definition Name]. The "Isolation Level" specifies the isolation or "sandboxing" of the module such as if the module can share the process with other modules or run in a dedicated process. The "Machine Size" specifies the hardware of the module. The "Enable High Availability" indicates if the module should be made highly available through replication. The "Instance Count Hint" specifies the number of instances of the module to create at runtime. The "Component Definitions" provides the collection of component definitions contained in the module definition. The "Aspect Definitions" provides the collection of aspect definitions contained in the module definition. These aspects are at the scope of the module and apply to the components with in the module. The module definitions 304a-304n can include additional metadata that is specific to the corresponding module.

Application definition 302 is the root of the definition tree 300 and the container for module definitions 304a-304n. The application definition construct can include metadata regarding "Name," "Base URI [universal resource identifier]," "ID [identifier]," "Version," "Base Path," "Module Definitions," "Aspect Definitions," "External Exports," and "Tenant." The "Name" is the name of the application definition. The qualified name of the application definition is the same as the "Name" because there is no container for the application definition. The "Base URI" is the base address (URI) of the application. Other constructs in the application have addresses relative to this base address. The "ID" is an identifier for the application. The "Version" specifies the version of the application. The "Base Path" is the physical base path of the application where application artifacts are deployed. The "Module Definitions" includes a collection of module definitions contained in the application definition 302. The "Aspect Definitions" includes a collection of aspect definitions contained in the application. The aspect definitions are at the scope of the application and apply to modules and components within the application. The "External Exports" includes a collection of export definitions where each external export definition represents a capability that is proffered by an external application or service. The "Tenant" describes the tenant associated with the application.

Aspects are cross cutting concerns that apply to all or several components and modules in the application like metering, throttling, billing, and the like. The component aspect definition 312 is an abstract construct that can be used to define a corresponding aspect. Aspect definitions can include a common set of metadata regarding "Name," "Qualified Name," "Before Advice Pointcut Predicate," "After Advice Pointcut Predicate," "Error Advice Pointcut Predicate," "Final Advice Pointcut Predicate," "Around Advice Pointcut Predicate," "Artifacts," and "Component Aspect Type." The "Name" distinguishably identifies the aspect definition within the scope of its container. The "Qualified Name" is the name of the aspect definition qualified by the names of its schema chain. The "Qualified Name" of the aspect definition is distinguishable within the application definition. For example, the qualified name is [Application Definition Name].[Module Definition Name].[Aspect Definition Name]. The "Before Advice Pointcut Predicate" is a predicate, or Boolean expression, that determines whether to fire the aspect before a given pointcut ("advice" and "pointcuts" are standard aspect-oriented programming, or AOP, concepts know in the art). The "After Advice Pointcut Predicate" is a predicate that determines whether to fire the aspect after the successful completion of a given pointcut. The "Error Advice Pointcut Predicate" is a predicate that determines whether to fire the aspect when an error occurs. The "Finally Advice Pointcut Predicate" is a predicate that determines whether to fire the aspect after the execution (successful or erroneous) of a given pointcut. The "Around Advice Pointcut Predicate" is a predicate that determines whether to fire the aspect before and after the execution of a given pointcut. The "Artifacts" is a list of artifacts for the aspect. These are aspect specific artifacts for the proper execution of the component, such as a configuration file or a binary. The "Component Aspect Type" is the runtime type represented corresponding to the aspect definition and is a common language runtime type. An aspect definition 312 can include additional metadata that is specific to the corresponding aspect.

The definition tree 300 in the application model is validated to enforce component interrelationship and metadata. Each definition construct can also specify custom validation logic against the application definition.

In one example, a distributed application manifest provides the above-described definition constructs expressing the component configurations and their interrelationships to each other and interactions in a technology and format agnostic manner. The manifest is a serialized form of the application definition 302 and captures the entire structure of the application 202. In one example, the manifest is format agnostic and can be serialized in a variety of formats, which can include scripting languages such as extensible markup language (XML), extensible application markup language (XAML), JavaScript object notation (JSON), or binary JSON (BSON) and many others now know or yet to be created. The following example distributed application manifest is serialized in JSON:

```
{
"Name": "MyApp",
"Id": "622BN4TFQB3UHFEERJGFXPVX4A",
"BaseUri": http://MyApp.cloudapp.net/,
"SelfLink": "...",
"Version": "1.0.0.100" ,
"References": [
        {"Type": "DistributedList",...}, {"Type":"TaskScheduler",...}, {"Type":"CloudQueue",...},
            {"Type": "WCFService",...} ],
"ModuleDefinitions":
[
        {"Name": "MyWebModule", Type" : "Web", "InstanceCountHint": 2, "Components": [ {...}] },
        {"Name": "MidTierModule", "Type" : "Stateful", "InstanceCountHint": 2,
        "IsolationLevel": "Process", "MachineSize": "Large",
        "PartitionPolicy": { "Type": "RangePartitionPolicy", "Keys": [ "A-G", "H-M","N-Z"] },
          "ReplicaCountHint": 2, "ReplicationFormat": "JSON", "WriteQuorum": 1,
          "Components":
          [
            {"Name": "MovieProcessor", "ModuleAffinity": "Stateful", ...
              "Imports":
              [
                        {"Name": "DistributedList", "Cardinality": "ExactlyOne", "InstancingPolicy":
                                "Pooled", "Constraint": {...} } },
                        {"Name": "NewMovies","Cardinality": "AtleastOne","InstancingPolicy":
                                "Singleton","Constraint": {...} } },
                        {"Name": "MovieService","Cardinality": "AtleastOne","InstancingPolicy":
                                "Singleton","Constraint": {...} } },
                        {"Name": "TaskScheduler","Cardinality": "AtleastOne","InstancingPolicy":
                                "Singleton","Constraint": {...} } },
              ],
            }
        ]
    }
...
```

```
]
...
}
```

The manifest includes an application definition, several module definitions, and so on. In the example, the module definitions include information on instances, partitions, and replicas. A stateless module definition can include an instance count that control the number of module instances and describes the scalability and high availability (HA) characteristics of a stateless module. A stateful module definition can include an instance count, a partition policy, and a replica count. Again, the instance count controls the number of module instances and thus the scalability. The partition policy defines the number of partitions assigned to a given module instance. The replica count controls the HA and determines the number of replicas of each partition. A stateless module definition can specify three stateless module instances. A stateful module definition can define three stateful module instances, where each stateful module can have four partitions, and each partition can have two replicas.

Figure 4:
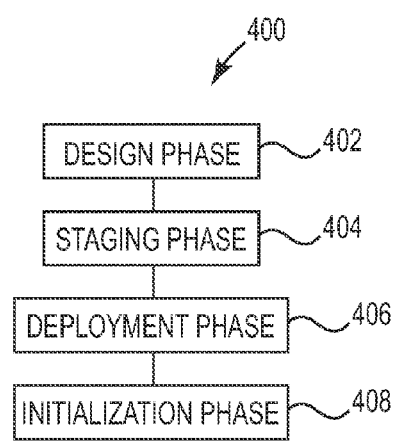
FIG. 4 is a block diagram illustrating an example application lifecycle of the distributed application of FIG. 2.

FIG. 4 illustrates how the application definition 302 is created and is used through an application lifecycle 400. The distributed application 202 is constructed during the application design phase at 402. The distributed application 202 is constructed as per the schema 200 prescribed by the application model. The output of the design phase 402 is a serialized application package that contains the application manifest and the artifacts that make up the different components 206a-206n. The application package is staged in an application fabric repository during an application staging phase at 404. The application package is posted to an end point on which an application farm fabric manager is listening. Once the distributed application 202 is posted, the application fabric farm manager shreds the application package. The application farm manager will access the artifacts for each component 206a-206n according to the application manifest and stores them in the application fabric repository. The application farm manager will also expose the application hierarchy as a Representative State Transfer (REST) resource that can be accessed by other applications or by the component code themselves. The distributed application 202 stored in the application fabric repository is deployed to a host farm during the deployment phase at 406. In order to deploy the distributed application 202 to the host farm, the farm manager will look at the application manifest and deploy the appropriate modules 204a-204n within the application to a corresponding set of nodes within the host farm. During an application initialization phase at 408, the various different modules 204a-204n deployed to the nodes are loaded into the host process and the components 206a-206n within the modules 204a-204n start executing. If the component is a service, it will create the end point and start listening on the end point.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of creating an application definition for a distributed application, comprising:
declaratively defining a plurality of constructs corresponding with a schema of the distributed application in a technology agnostic manner, the distributed application including one or more modules, and the one or more modules include, respectively, one or more components;
wherein the constructs include the application definition, a module definition, and a component definition, wherein the constructs include metadata, respectively; and
declaratively defining in metadata an amount of module instances and an amount of partitions assigned to the module instances, respectively, to be activated at runtime;
wherein at runtime, an application framework provides the connections between the components, and wherein at runtime the application definition is used by the application framework to validate a compositional structure of the distributed application.

2. The method of claim 1 wherein the application definition includes a plurality of module definitions and the module definitions include a plurality of component definitions, respectively.

3. The method of claim 2 wherein the module definitions include a common set of metadata shared in the module definitions, respectively.

4. The method of claim 3 wherein the common set of metadata includes metadata regarding "Name," "Qualified Name," "Isolation Level," "Machine Size," "Enable High Availability," "Instance Count Hint," "Component Definitions," and "Aspect Definitions."

5. The method of claim 2 wherein the component definitions include a common set of metadata shared in the module definitions, respectively.

6. The method of claim 5 wherein the common set of metadata includes metadata regarding "Component Name," "Qualified Name," "Version," "Activation Policy," "Module Affinity," "Component Type," and "Artifacts."

7. The method of claim 1 and further comprising serializing the application definition.

8. The method of claim 7 wherein the application definition is serialized from a scripting language.

9. The method of claim 1 and further comprising including the application definition within an application manifest.

10. The method of claim 1 wherein the application definition is used through an application lifecycle.

11. The method of claim 1 wherein the constructs include a component export definition, a component import definition and a component aspect definition.

12. The method of claim 11 wherein the component export definition includes metadata regarding "Name," "Qualified Name," "Exporting Component Name," "Proxy Artifacts," "Proxy Type Hint," "Aspects," "Contract," "Visibility," "Listen Address," "Claimed Listen Address Hint," "Canonical Address," and "Publish Address."

13. The method of claim 11 wherein the component import definition includes metadata regarding "Name," "Qualified Name," "Owner Component," "Instancing Policy," "Cardinality," and "Constraint."

14. The method of claim 11 wherein the component aspect definition includes metadata regarding "Name," "Qualified Name," "Before Advice Pointcut Predicate," "After Advice Pointcut Predicate," "Error Advice Pointcut Predicate," "Final Advice Pointcut Predicate," "Around Advice Pointcut Predicate," "Artifacts," and "Component Aspect Type."

15. The method of claim 1 wherein the application definition includes metadata regarding "Name," "Base URI [universal resource identifier]," "ID [identifier]," "Version," "Base Path," "Module Definitions," "Aspect Definitions," "External Exports," and "Tenant."

16. A computer readable storage medium, which is not a transitory propagating signal, storing computer executable instructions for controlling a computing device to perform a method comprising:
creating an application definition for a distributed application described in a schema, the distributed application including one or more modules, and the one or more modules include, respectively, one or more components, wherein the application definition includes a plurality of constructs corresponding with a schema of the distributed application, wherein creating the application definition includes:
expressing component configurations and constraints within the constructs in a declarative manner; and
expressing component dependencies, interrelationships, and interactions within the constructs in a declarative manner;
wherein the constructs include metadata in a technology agnostic format; and
adjustably programming the metadata to declaratively define an amount of module instances and an amount of partitions assigned to the module instances, respectively, to be assigned at runtime;
wherein at runtime, an application framework provides the connections between the components, and wherein at runtime the application definition is used by the application framework to validate a compositional structure of the distributed application.

17. The computer readable storage medium of claim 16 and further comprising serializing the application definition.

18. The computer readable storage medium of claim 16 and further including applying the application definition to validate a compositional structure of the distributed application.

19. The computer readable storage medium of claim 18 and further including applying the application definition to enforce the compositional structure at runtime.

20. A method of creating an application definition for a distributed application, comprising:
declaratively defining a plurality of constructs corresponding with a schema of the distributed application in a technology agnostic manner, wherein the schema includes one or more modules and the one or more modules include, respectively, one or more components;
wherein the constructs include the application definition, a module definition for the one or more modules, respectively, a component definition for the one or more components, respectively, a component export definition for the one or more components providing an export, respectively, a component import definition for the one or more components using an import, respectively, and a component aspect definition;
wherein the constructs include metadata; and
adjustably programming the metadata to declaratively define an amount of module instances and an amount of partitions assigned to the module instances, respectively, to be assigned at runtime;
wherein at runtime, an application framework provides the connections between the components, wherein at runtime the application definition is used by the application framework to validate and enforce a compositional structure of the distributed application.

21. A system for creating an application definition for a distributed application in an application framework, the system comprising:
a processor; and
memory comprising instructions executable by the processor to:
declaratively define a plurality of constructs to correspond with a schema of the distributed application in a technology agnostic manner, the distributed application includes one or more modules, and the one or more modules include, respectively, one or more components,
the plurality of constructs include an application definition, a module definition, and a component definition corresponding with one or more module instances of the schema of the distributed application, the one or more module instance having a plurality of components according to the component definition, and the constructs include metadata;
declaratively define in metadata in the module definition an amount of module instances and an amount of partitions assigned to the module instances to be activated at runtime;
provide the connections between the components at runtime with the application framework; and
validate a compositional structure of the distributed application with the application definition used by the application framework.

22. The system of claim 21 wherein declaratively define in metadata includes adjustably program the metadata to declaratively define an amount of module instances to be assigned at runtime.

23. The system of claim 21 wherein the memory comprises instructions executable by the processor to enforce the compositional structure of the distributed application.

24. The system of claim 21 wherein the memory comprises instructions executable by the processor to serialize the application definition.

25. The system of claim 21 wherein the memory comprises instructions executable by the processor to declaratively define a component export definition, a component import definition, and a component aspect definition.

* * * * *